US011953616B2

(12) United States Patent
Mayer et al.

(10) Patent No.: US 11,953,616 B2
(45) Date of Patent: Apr. 9, 2024

(54) RADAR SENSOR INCLUDING SYNCHRONIZED HIGH FREQUENCY COMPONENTS

(71) Applicant: Robert Bosch GmbH, Stuttgart (DE)

(72) Inventors: Marcel Mayer, Lonsee (DE); Dirk Steinbuch, Wimsheim (DE); Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 668 days.

(21) Appl. No.: 17/253,482

(22) PCT Filed: Jun. 18, 2019

(86) PCT No.: PCT/EP2019/066025
§ 371 (c)(1),
(2) Date: Dec. 17, 2020

(87) PCT Pub. No.: WO2020/064155
PCT Pub. Date: Apr. 2, 2020

(65) Prior Publication Data
US 2021/0124014 A1 Apr. 29, 2021

(30) Foreign Application Priority Data
Sep. 27, 2018 (DE) ...................... 10 2018 216 538.6

(51) Int. Cl.
*G01S 7/40* (2006.01)
*G01S 13/931* (2020.01)

(52) U.S. Cl.
CPC .............. *G01S 7/4017* (2013.01); *G01S 7/40* (2013.01); *G01S 13/931* (2013.01)

(58) Field of Classification Search
CPC ........ G01S 7/4017; G01S 7/40; G01S 13/931; G01S 7/03; G01S 7/35
See application file for complete search history.

(56) References Cited

U.S. PATENT DOCUMENTS 5,940,025 A      8/1999   Koehnke et al.
9,880,261 B2 *   1/2018   Subburaj ................. G01S 13/87
                          (Continued)

FOREIGN PATENT DOCUMENTS

JP    2011220578 A    11/2011
WO    2012152474 A1   11/2012

OTHER PUBLICATIONS

International Search Report for PCT/EP2019/066025, dated Oct. 10, 2019.

*Primary Examiner* — Olumide Ajibade Akonai
*Assistant Examiner* — Yonghong L
(74) *Attorney, Agent, or Firm* — NORTON ROSE FULBRIGHT US LLP; Gerard A. Messina

(57) ABSTRACT

A radar sensor is described. The radar sensor includes at least two synchronously operating high frequency components, which each have at least one signal path in which the phase of the transmitted high frequency signal is varied by a temperature-dependent phase difference. In each high frequency component, a phase detector is connected in parallel to the signal path, which supplies a signal that assumes an extremum at a certain phase difference independently of the temperature, and a phase shifter is situated in the signal path, ith the aid of which the phase difference is settable in such a way that the signal of the phase detector assumes the extremum.

9 Claims, 2 Drawing Sheets

(56) References Cited

U.S. PATENT DOCUMENTS

| | | | |
|---|---|---|---|
| 2015/0276919 A1 | 10/2015 | Matsumura | |
| 2017/0090015 A1* | 3/2017 | Breen | G01S 7/032 |
| 2018/0115409 A1* | 4/2018 | Nayyar | G01S 13/343 |
| 2020/0025899 A1* | 1/2020 | Starzer | G01S 7/352 |

* cited by examiner

RADAR SENSOR INCLUDING SYNCHRONIZED HIGH FREQUENCY COMPONENTS

FIELD

The present invention relates to a radar sensor including at least two synchronously operating high frequency components, which each have at least one signal path in which the phase of the transmitted high frequency signal is modified by a temperature-dependent phase difference.

BACKGROUND INFORMATION

In the course of the endeavors to come closer to the goal of completely autonomous driving, there is a trend when it comes to radar sensors for motor vehicles toward increasing complexity and, in particular, toward an increase in the number of the transmission and receiver channels, for example to implement multiple input multiple output (MIMO) concepts or digital beam-forming concepts. From reliability and power loss aspects, it is desirable to limit the size of the high frequency components used in the radar sensors (monolithic microwave integrated circuits, MMICs), and instead use a plurality of preferably identically designed MMICs, which are synchronized with one another in such a way that the phase relationships between the signals transmitted in all transmission channels are known and may adequately be taken into consideration during the evaluation of the receive signals.

Due to the space requirement of the individual MMICs, the distances between the individual MMICs become so large with an increasing number of components that the signal propagation times of the signals used for synchronization cannot be disregarded. A particular difficulty arises from the fact that, with larger spatial distances between the individual MMICs, it also can no longer be assumed that all MMICs have the same temperature, so that propagation time differences and phase differences of an unknown magnitude may occur due to the temperature response of the electronic components.

SUMMARY

It is an object of the present invention to provide an option for achieving a precise synchronization of the high frequency components, without impairment of the function of the radar sensor, even in the event of temperature-dependent phase differences.

This object may be achieved according to an example embodiment of the present invention in that, in each high frequency component, a phase detector is connected in parallel to the signal path, which supplies a signal that assumes an extremum at a certain known phase difference independently of the temperature, and in that a phase shifter is situated in the signal path, with the aid of which the phase difference is settable in such a way that the signal of the phase detector assumes the extremum.

The present invention may offer the advantage that the temperature-dependent phase differences, which are unknown in terms of their nature, may be set to known values with the aid of the phase shifter and the phase detector, so that they may be taken into consideration during the synchronization of the high frequency components. Even though the phase detectors used according to the present invention do not enable a quantitative measurement of the phase difference, they yield the advantage that the point at which their signal assumes the extremum is independent of the temperature, so that no interfering temperature influences may occur during the adjustment of the phase difference. The parts to be added in the individual high frequency components, i.e., the phase detectors and phase shifters, may be integrated into the components without difficulty, without impairing the power loss or the measuring accuracy of the parts in a noteworthy manner.

Advantageous embodiments and refinements of the present invention are described herein.

The phase detectors may, for example, be rectifier diodes which, when the signals of opposite ends of the signal path are applied thereto, supply a DC voltage, as the output signal, which is proportional to the superimposed amplitude of the signals, and thus varies between a maximum (at structural superposition) and a minimum (zero at complete cancellation of the signals), as a function of the phase difference.

For example, an IQ modulator may be used as a phase shifter in the signal path.

The synchronization of the different high frequency components may take place via special synchronization signals which are exchanged between the components. In another specific embodiment, the transmit signal of a high frequency component or of a transmission channel of this component (of the master) is simultaneously used as the synchronization signal for another component (slave). In the process, each individual component may have multiple signal paths in which temperature-dependent phase differences may potentially occur. In this case, a phase detector and a phase shifter are assigned to each of these signal paths.

Each high frequency component may include its own voltage-controlled local oscillator for generating the high frequency signal. A shared reference signal, which is supplied to all components, may then be used for the synchronization of the oscillators in the different components. Since the transmission path for this reference signal does not have a temperature response, the phase differences arising from the different propagation times of the reference signal for the individual oscillators are known or settable to known values by a suitable selection of the line lengths.

In the case of a frequency-modulated continuous wave (FMCW) radar, each high frequency component includes one mixer for each receiver channel, in which the received signal is mixed with a portion of the signal transmitted at the same point in time, so that an intermediate frequency signal is generated, whose spectrum provides information about the distances and relative velocities of the located objects during the measuring operation of the radar sensor. In one or multiple calibration mode(s), these mixers may be used to measure the phase differences in different closed signal path chains. Since at least some of these chains also include the path of the synchronization signal from one high frequency component to another, it is possible, when the phase differences for the remaining signal paths were calibrated with the aid of the phase detectors and phase shifters, to determine all relevant phase differences so that the high frequency components may be correctly synchronized with one another.

In one specific embodiment of the present invention, each high frequency component may include an additional mixer, with the aid of which the complex amplitude (magnitude and phase) of the transmit signal may be monitored.

One exemplary embodiment is described in greater detail hereafter based on the figures.

DETAILED DESCRIPTION OF EXAMPLE EMBODIMENTS

Figure 1:
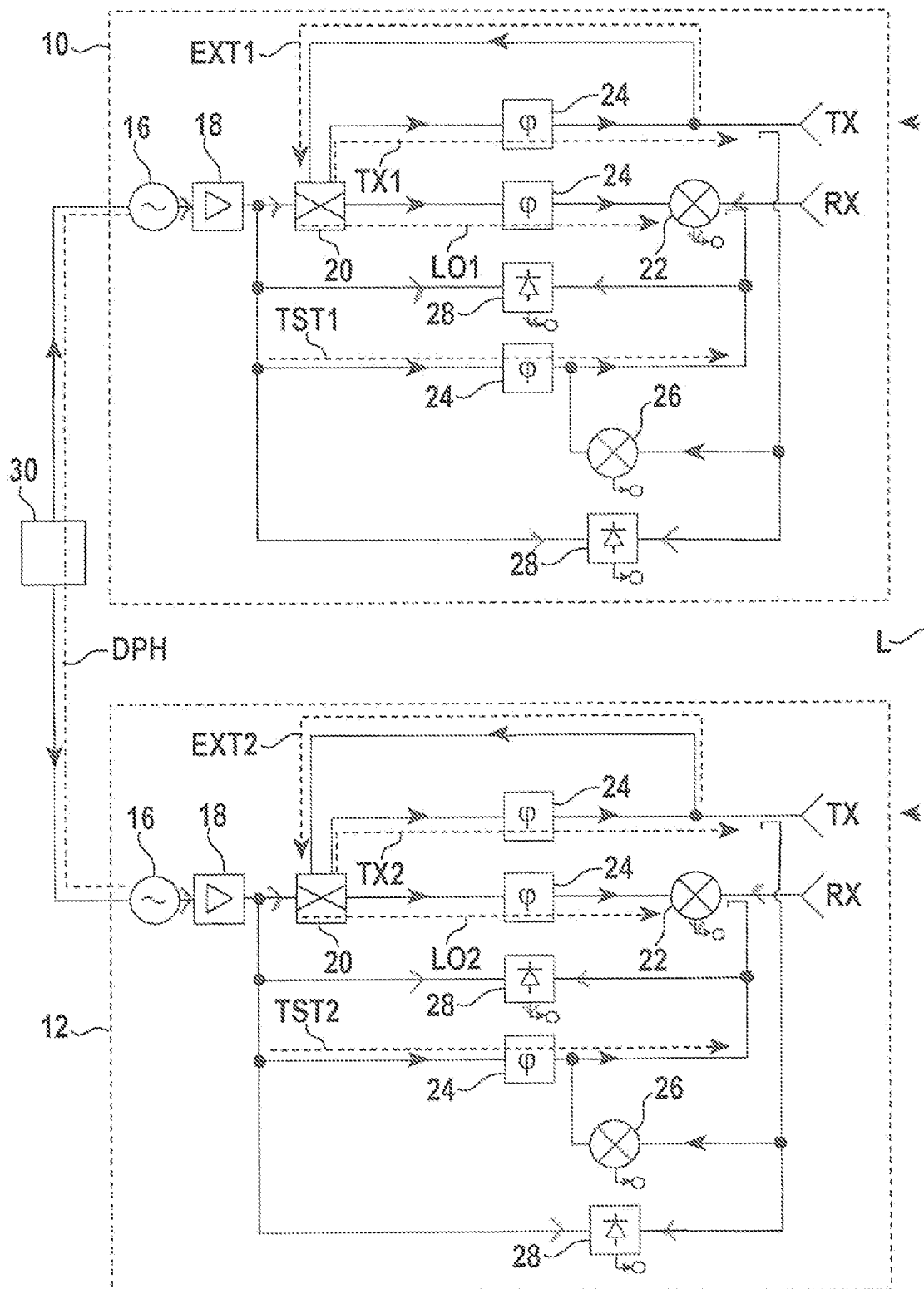
FIG. 1 shows a simplified circuit diagram of a radar sensor according to an example embodiment of the present invention including two high frequency components synchronized with one another.

The radar sensor shown in FIG. 1 includes two high frequency components 10, 12, which are designed as MMICs, for example, and may be situated on a shared circuit board. Each high frequency component includes multiple transmission channels and multiple receiver channels. For the sake of a simplified illustration, however, only a single transmission channel TX and a single receiver channel RX is shown for each high frequency component.

A signal path L is provided for the synchronization of high frequency components 10, 12, which couples the outputs of transmission channels TX of the two high frequency components to one another. The radar sensor may, for example, be operated in such a way that high frequency component 10 acts as the master, and high frequency component 12 acts as the slave, which uses the signal transmitted on signal path L as the synchronization signal. Since the two high frequency components 10, 12 necessarily have to be situated at a certain distance from one another on the circuit board, the signal transmitted on signal path L has a certain signal propagation time, which leads to an a priori unknown phase difference $\underline{L}$, which has to be compensated for a correct synchronization of the components.

Each of the two high frequency components 10, 12 includes a local oscillator 16 including a downstream amplifier 18. The output signal of amplifier 18, on the one hand, is fed into transmission channel TX via a coupler 20 and sent as transmit signal and, on the other hand, is supplied to a first input of a mixer 22. The signal received in receiver channel RX is supplied to a second input of mixer 22, so that mixer 22 supplies the mixed product of the signals present at the two inputs as the output signal.

In high frequency component 10, a signal path EXT1 leads from the output of transmission channel TX back to coupler 20. This makes it possible to use a signal arriving via signal path L as an external transmit signal, instead of the signal of the own local oscillator 16 of this component. A signal path from coupler 20 to the output of transmission channel TX is denoted by TX1. A signal path from coupler 20 to mixer 22 is denoted by LO1. These two signal paths each include a phase shifter 24, which is formed by an IQ modulator, for example.

When no signal is received in receiver channel RX, the output signal of amplifier 18 may be directly coupled in at the associated input of mixer 22 via a signal path TST1. Signal path TST1 also includes a phase shifter 24. The output of this phase shifter is connected to an input of a further mixer 26. The transmit signal which is tapped at the output of transmission channel TX may be supplied to the other input of this mixer.

A phase detector 28, which is formed by a rectifier diode, for example, is connected between this output of transmission channel TX and the output of amplifier 18. A further phase detector 28 is connected between the output of amplifier 18 and the receiver input of mixer 22.

The inputs of the local oscillators 16 of the two high frequency components 10, 12 are connected to a shared reference signal source 30, which is used to synchronize the oscillators with one another. The connections between the two oscillators 16 and reference signal source 30 may be regarded as a further signal path DPH on which a phase difference $\underline{DPH}$ may occur, which is dependent on the particular line lengths. For example, the arrangement may be selected in such a way that the lines from reference signal source 30 to each of the two oscillators 16 have the same length. In this case, the phase relationship $\underline{DPH}=0$ applies.

High frequency component 12 has the same design as high frequency component 10. The different signal paths are denoted here by the same letter identifiers as in high frequency component 10, however with the index "2" instead of "1."

In signal path TX1, a phase difference TX1 occurs, which may have a component dependent on the local temperature. The same also applies to signal paths LO1, EXT1 and TST1. The associated phase differences are denoted here in each case with the same reference symbols, but are provided with an underscore. The same also applies to the signal paths in high frequency component 12. Phase difference $\underline{L}$ in signal path L is also generally temperature-dependent.

For a synchronization of the two high frequency components 10, 12, it is necessary to calibrate the temperature-dependent phase differences. For this purpose, the radar sensor may be operated in four different calibration modes.

In a calibration mode 1, high frequency component 10 provides its transmit signal (output of transmission channel TX) to high frequency component 12 as a synchronization and transmit signal. The signal then runs via signal paths TX1, L, EXT2 and LO2 to mixer 22. There, the mixed product with the signal which is supplied to mixer 22 in high frequency component 12 via signal path TST2 is formed as the measuring signal. The output signal of the mixer then represents the following phase difference:

$$D1 = (\underline{DPH} + \underline{TX1} + \underline{L} + \underline{EXT2} + \underline{LO2}) - \underline{TST2} \tag{1}$$

In a calibration mode 2, high frequency component 12 provides its transmit signal to the mixer of high frequency component 10. The signal runs via signal paths TX2, L, EXT1 and LO1 to mixer 22 of high frequency component 10. There, the mixed product with the signal supplied via signal path TST1 is formed. The output signal of mixer 22 in this case is $$D2 = (-\underline{DPH} + \underline{TX2} + \underline{L} + \underline{EXT1} + \underline{LO1}) - \underline{TST1} \tag{2}$$

In a calibration mode 3, high frequency component 10 provides to its own mixer the transmit signal, which is transmitted via signal path LO1. There, the mixed product is formed with the signal which is transmitted as the reference signal via signal path TST1. The output signal of the mixer then corresponds to the phase difference $$D3 = \underline{LO1} - \underline{TST1} \tag{3}$$

In a calibration mode 4, high frequency component 12 provides to its own mixer 22 the transmit signal which is supplied to the mixer via signal path LO2. There, the mixed product is formed with the reference signal which is supplied via signal path TST2. The output signal of the mixer then represents the phase difference:

$$D4 = \underline{LO2} - \underline{TST2} \tag{4}$$

As a result of the measurements in the four calibration modes, an equation system including the ten variables is obtained: $\underline{DPH}$, $\underline{TX1}$, $\underline{L}$, $\underline{EXT2}$, $\underline{LO2}$, $\underline{TST2}$, $\underline{TX2}$, $\underline{EXT1}$, $\underline{LO1}$, and $\underline{TST1}$.

Therein, DPH is determinable based on the line lengths and may therefore be assumed to be known. Phase difference L is not directly relevant for the calibration of the two high frequency components, but only the sum of phase differences L+EXT2, or sum L+EXT1, so that L may be eliminated as an independent variable, and instead only the independent variables (L+EXT2) and L+EXT1) need to be considered. Eight unknowns thus remain, with which, however, the equation system still remains underdetermined.

Figure 2:
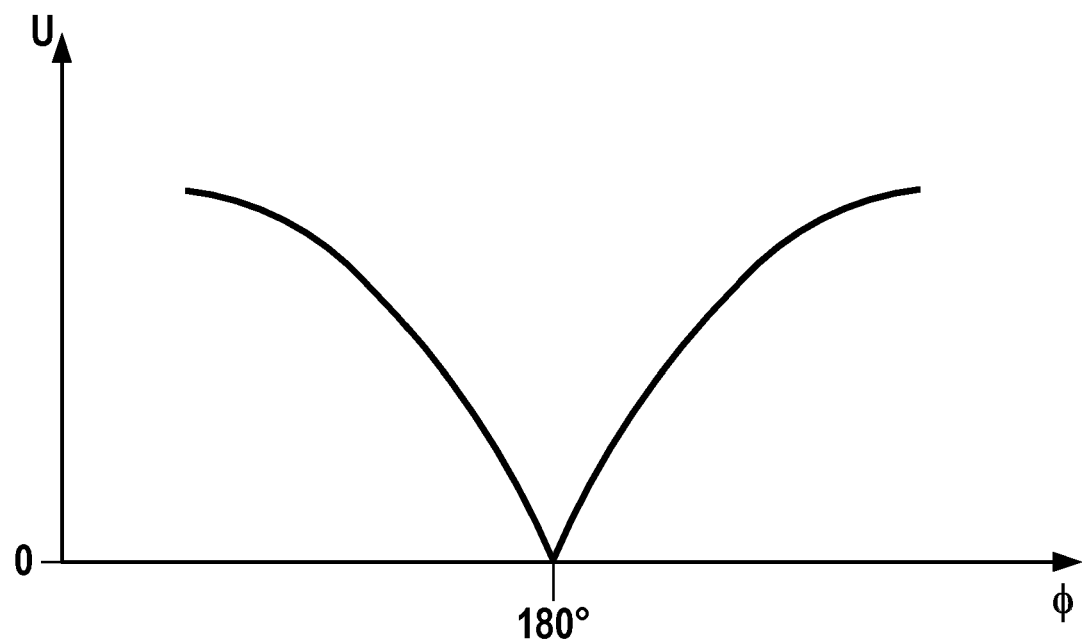
FIG. 2 shows a signal characteristic curve of a phase detector as it is used in the high frequency components according to FIG. 1.

For a solution of the equation system, four of the eight unknowns therefore have to be determined in a different manner. However, instead of measuring these unknowns directly (which would again require active parts having their own unknown temperature response), according to the present invention the unknown phase differences are adjusted to known values with the aid of phase detectors 28 and phase shifters 24. For this purpose, phase detectors 28 are used which, even though they do not allow an absolute measurement of the phase difference, due to their specific characteristic curve progression allow a temperature-independent determination of a phase difference at which the characteristic curve assumes a minimum (or maximum). One example of such a characteristic curve is shown in FIG. 2. Here, a DC voltage U, which drops across the rectifier diode serving as phase detector 28, is plotted as a function of phase difference φ of the signals which are superposed with one another in the rectifier diode. With a sinusoidal progression of the superposed signals, the characteristic curve has maxima at the phase differences 0 and 360°, and a distinct minimum occurs at the phase difference of 180°, which, due to the characteristic curve progression (that cannot be differentiated here), is sharply localizable. With the aid of the associated phase shifter 24, the phase difference may then be set in such a way that output signal U supplied by the phase detector assumes this minimum. It is then known that the phase difference between the signals that are compared to one another is 180°.

In FIG. 1, it is possible in this way to set phase differences TX1 to 180° with the aid of phase detector 28, which is connected in high frequency component 10 between amplifier 18 and the output of transmission channel TX, and with the aid of phase shifter 24 in signal path TX1. With the aid of phase detector 28, which is connected between amplifier 18 and mixer 22, and with the aid of phase shifter 24 in signal path TST1, phase difference TST1 may be set to 180°. The same also applies to phase differences TX2 and TST2 in high frequency component 12. With this, LO1 and LO2 from equations (3) and (4) may also be determined, so that it is possible to solve the remaining equation system for the unknowns (L+EXT2) and (L+EXT1). Since all relevant phase shifts are thus determinable independently of the temperature, it is possible to precisely synchronize high frequency components 10 and 12 with one another.

In the shown example, it is additionally possible, with the aid of mixer 26, to directly compare the signal transmitted in the particular transmission channel TX to the signal which is supplied to mixer 22 in calibration mode 1 or 2.

Possible deviations may then be compensated for with the aid of phase shifter 24 in signal path LO1 or LO2.

The functions of the above-described parts of high frequency components 10, 12 during the measuring operation and in the different calibration modes are controlled by an electronic control unit, which is not shown.

The invention claimed is:

1. A radar sensor, comprising:
    at least two synchronously operating high frequency components, in which each has at least one respective signal path in which a phase of a transmitted high frequency signal on the respective signal path varies along the respective signal path based on temperature, a respective phase shifter being situated in each of the respective signal paths;
    wherein in each of the high frequency components, a respective phase detector is connected at a first end of the respective signal path and is connected at a second, opposite end of the respective signal path, such that the respective phase detector is connected in parallel to the respective signal path, the respective phase detector configured to supply a signal, the supplied signal assuming an extremum in a voltage amplitude at a certain phase difference, the certain phase difference being a difference between a phase of the transmitted high frequency signal at the first end of the respective signal path and a phase of the transmitted high frequency signal at the second, opposite end of the respective signal path, and
    wherein in each of the high frequency components, the respective phase shifter is configured to set, using the respective phase detector, a phase difference between the phase of the transmitted high frequency signal at the first end of the respective signal path and the phase of the transmitted high frequency signal at the second, opposite of the respective signal path in such a way that the signal supplied by the respective phase detector assumes the extremum in the voltage amplitude.

2. The radar sensor as recited in claim 1, wherein each of the respective phase detectors is formed by a rectifier diode at which the transmitted high frequency signal at the first end of the respective signal path and the transmitted high frequency signal at the second, opposite end of the respective signal path are superposed with one another.

3. The radar sensor as recited in claim 1, wherein each of the respective phase shifters is an IQ modulator.

4. The radar sensor as recited in claim 1, wherein each of the high frequency components includes a respective local oscillator, and each of the respective local oscillators of the high frequency components is connected via a respective line having a known length to a shared reference signal source.

5. The radar sensor as recited in claim 4, wherein each of the high frequency components includes a respective mixer, which is configured to mix a signal received in a receiver channel with a signal transmitted in a transmission channel.

6. The radar sensor as recited in claim 5, wherein a synchronization signal output of each high frequency component of the high frequency components is couplable via a synchronization signal path to a respective synchronization signal input of every other high frequency component, and in each high frequency component, a synchronization signal received by the high frequency component via the respective synchronization signal path is fed from the respective synchronization signal input as a transmit signal via a respective further signal path to the respective mixer of the high frequency component.

7. The radar sensor as recited in claim 6, wherein, in each high frequency component of the high frequency components, an output of at least one transmission channel forms a synchronization input and the synchronization signal output of the high frequency component.

8. The radar sensor as recited in claim 6, wherein an output signal of the respective local oscillator of each high frequency component of the high frequency components is fed as a test signal via a respective signal path to the respective mixer of the high frequency component.

9. The radar sensor as recited in claim 5, wherein each high frequency component of the high frequency components includes a respective further mixer, which is configured to monitor a complex amplitude of the signal transmitted in the transmission channel of the high frequency component.

\* \* \* \* \*